(12) United States Patent
Sheen (10) Patent No.: US 7,281,814 B2
(45) Date of Patent: Oct. 16, 2007

(54) CAR FLASHLIGHT STRUCTURE

(76) Inventor: Tieng-Teng Sheen, P.O. Box No. 6-57, Junghe, Taipei 235 (TW)

( * ) Notice: Subject to any disclaimer, the term of this patent is extended or adjusted under 35 U.S.C. 154(b) by 229 days.

(21) Appl. No.: 11/140,957

(22) Filed: Jun. 1, 2005

(65) Prior Publication Data
US 2006/0274541 A1    Dec. 7, 2006

(51) Int. Cl.
F21L 4/00 (2006.01)
F21L 4/04 (2006.01)
(52) U.S. Cl. .................. 362/183; 362/187; 362/196; 362/204; 362/205
(58) Field of Classification Search .............. 362/183, 362/187–188, 196–198, 200, 204–206, 656–659, 362/652–653, 646–647, 640–641
See application file for complete search history.

(56) References Cited
U.S. PATENT DOCUMENTS 3,835,309 A * 9/1974 Witte et al. ............... 362/183
4,819,139 A * 4/1989 Thomas ..................... 362/183
4,916,588 A * 4/1990 Chu ........................... 362/203
5,865,525 A * 2/1999 Kibler et al. ............... 362/187

* cited by examiner

Primary Examiner—Jayprakash Gandhi
Assistant Examiner—Sean P Gramling
(74) Attorney, Agent, or Firm—Troxell Law Office, PLLC (57) ABSTRACT

A car flashlight structure, which can be plugged into a car charger, consisting of a cylindrical body, a cap disposed on a front end of the cylindrical body, a casing cover socket joined to the cap and an illumination assembly disposed within the cylindrical body. The illumination assembly is provided with at least one accumulator unit, at least one LED light, and configured with a contact switch. According to the aforementioned structure, the car flashlight can be plugged into a conventional car charger to replenish electric power, and is taken out directly from the charger to use, whereupon the cap is pushed forward to actuate the contact switch and provide an electric current to the LED light of the illumination assembly, thereby furnishing the user with auxiliary illumination.

9 Claims, 12 Drawing Sheets

CAR FLASHLIGHT STRUCTURE

BACKGROUND OF THE INVENTION (a) Field of the Invention

The present invention relates to a car flashlight structure, and more particularly to a flashlight that is able to provide car interior illumination, and that facilitates using a car charger to replenish electric power. Moreover, a unique assembly of the flashlight effectively minimizes the physical size, thereby reducing the space occupied by the flashlight and facilitating storing away when not in use.

(b) Description of the Prior Art

Modern people attach great importance to the quality of life, thus, when choosing a car, buying a car or purchasing car accessories, apart from the requirements for operability and comfort, importance has also began to be attached to car interior accessories that function together. However, when driving or riding in a car at night, because of the surrounding darkness, if the driver or passenger needs to carry out some task in the car, for instance, look for an article, adjust the interior air conditioning or car stereo, change a music disc or even take some food, an auxiliary light source is usually required to illuminate the car interior to assist in carrying out the task.

The absence of an auxiliary light source is currently resolved by fitting an overhead night light in the roof of the car interior. However, the overhead night light is of a fixed type that only projects light downwards, thereby leaving many dead angles where the light does not illuminate. Moreover, if the user wants to conduct tasks outside the car where there is no lighting, the user is unable to use the overhead night light in the car interior for auxiliary illumination. Hence, some people may carry a flashlight when traveling in a car, which can be used for auxiliary illumination when inside the car or when outside the car in unlit surroundings. However, auxiliary illumination provided by a conventional flashlight relies on ancillary batteries. If battery power is exhausted when using the flashlight, then electric power required by the flashlight cannot be replenished.

Currently, a car, cigarette lighter connector can be bought for use as a charger to charge a car flashlight. However, the conventional car flashlight is oversized, and the majority of conventional car cigarette lighter connectors are fitted at a side of the gear lever, which takes up space when charging the flashlight, and hinders driving the car, thus increasing the risk of a car accident.

In light of the aforementioned shortcomings of the conventional car flashlight during practical usage, having accumulated years of experience in related arts, attentively and circumspectly carried out extensive study and exploration to ultimately design a new structure for a car flashlight.

SUMMARY OF THE INVENTION

Hence, a primary objective of the present invention is to provide a car flashlight structure, wherein a unique assembly of the flashlight effectively minimizes the physical size of the flashlight, thereby reducing the space occupied by the flashlight when not in use. Moreover, the present invention is able to conveniently use a car charger to replenish electric power in the flashlight, thereby achieving the need for convenience of use and safety when driving.

In order to achieve the aforementioned objectives, the present invention consists of a cylindrical body, a cap, a casing cover, and an illumination assembly. The cylindrical body includes a first casing reciprocally combined with a corresponding second casing, At least one first slide track is defined on a surface of the first casing, and at least one second slide track is defined on a surface of the second casing, moreover, a through hole is further defined in the first casing. The cap, which is disposed on a front end of the aforementioned cylindrical body, is provided with a sleeve, and a transparent cover seals a front end thereof. First slide strips corresponding to the aforementioned first slide tracks and second slide strips corresponding to the aforementioned second slide track extend from a rear end of the sleeve, which enable the cap to slide along the lengths of the first slide tracks and the second slide track of the cylindrical body respectively. Furthermore, a rear end of the sleeve forms an acting face. The casing cover is provided with a holding cavity in one end thereof, which provides for socket joining rear ends of the aforementioned first casing and second casing of the cap therein. A through hole is defined center of the casing cover, and a contact bar is disposed therein, which is used to make an electrical contact with a first contact point within a charger. Moreover, an elastic electrically conducting contact member extends from a front end of the contact bar. The illumination assembly is configured between the first casing and the second casing within the aforementioned cylindrical body, and is provided with at least a base plate, on top of which is configured at least one accumulator unit, and at least one LED light. Furthermore, a first electrical conducting contact portion extends from a rear end of the base plate, and makes an electrical connection with the elastic electrical conducting contact member. Moreover, a second electrical conducting contact portion extends from a side of the base plate, and penetrates the through hole of the first casing. The second electrical conducting contact portion is used to make an electrical contact with a second contact point within the charger. A contact switch is further configured on the base plate so as to correspond to the aforementioned acting face.

According to the aforementioned structure, the car flashlight of the present invention can be plugged into the charger in a car to replenish electric power. When wanting to use the flashlight, the user takes out the flashlight from the charger and directly pushes the cap forward to actuate the acting face, which causes the contact switch to make an electrical connection that provides an electric current to the LED light of the illumination assembly, thereby enabling the LED light to emit light that provides the user with auxiliary illumination.

To enable a further understanding of said objectives and the technological methods of the invention herein, brief description of the drawings is provided below followed by detailed description of the preferred embodiments.

DETAILED DESCRIPTION OF THE PREFERRED EMBODIMENTS

Figure 1:
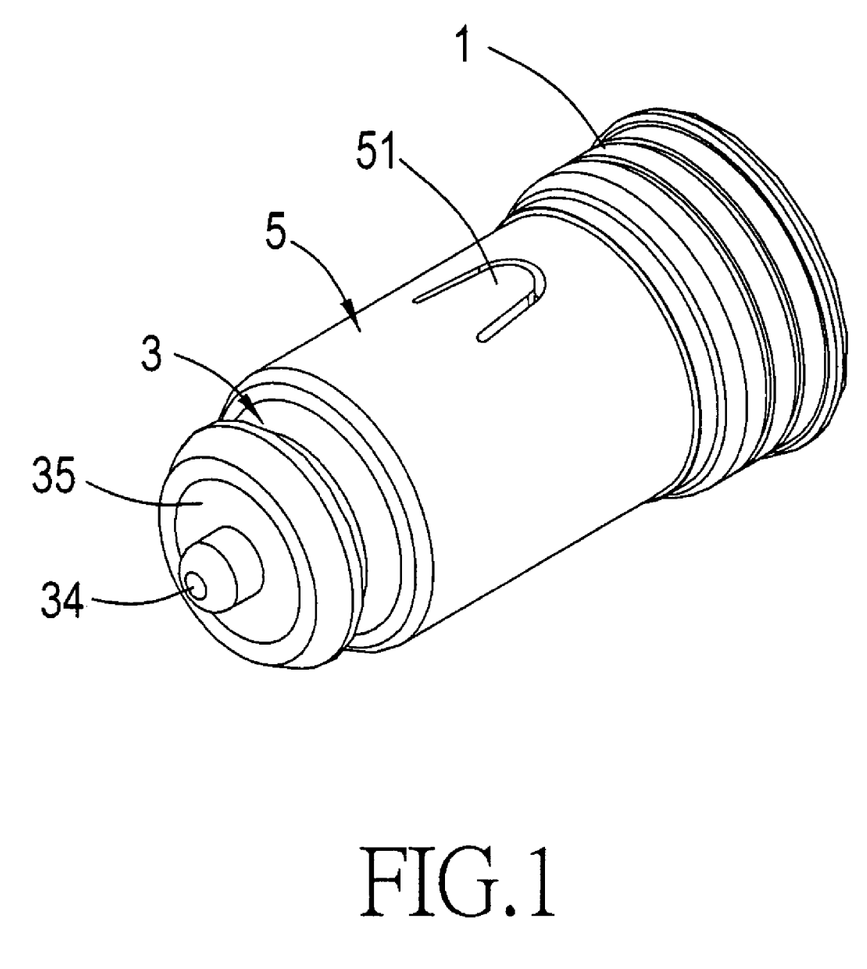
FIG. 1 shows an elevational view of an exterior according to the present invention.
Figure 2:
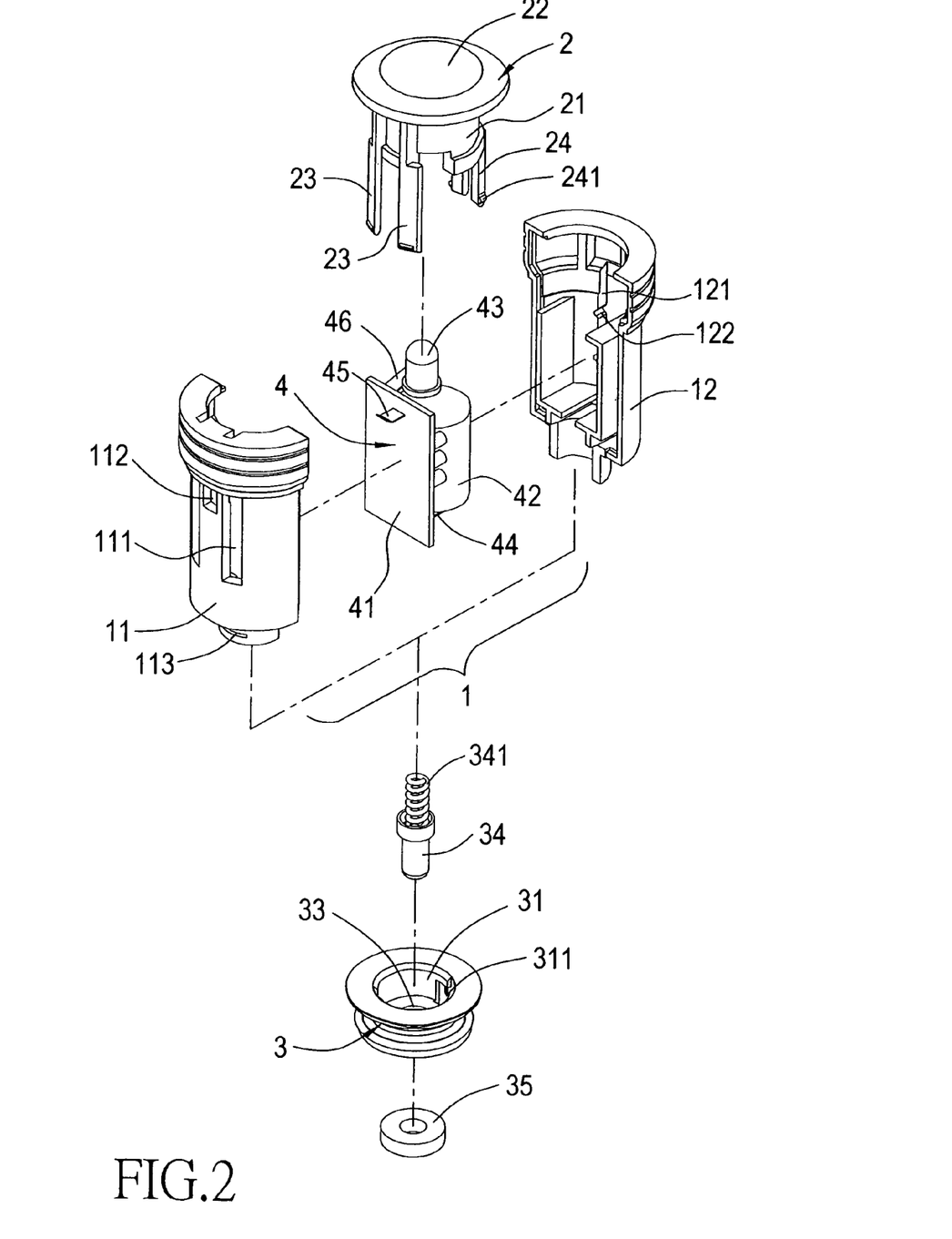
FIG. 2 shows an exploded elevational view according to the present invention.
Figure 3:
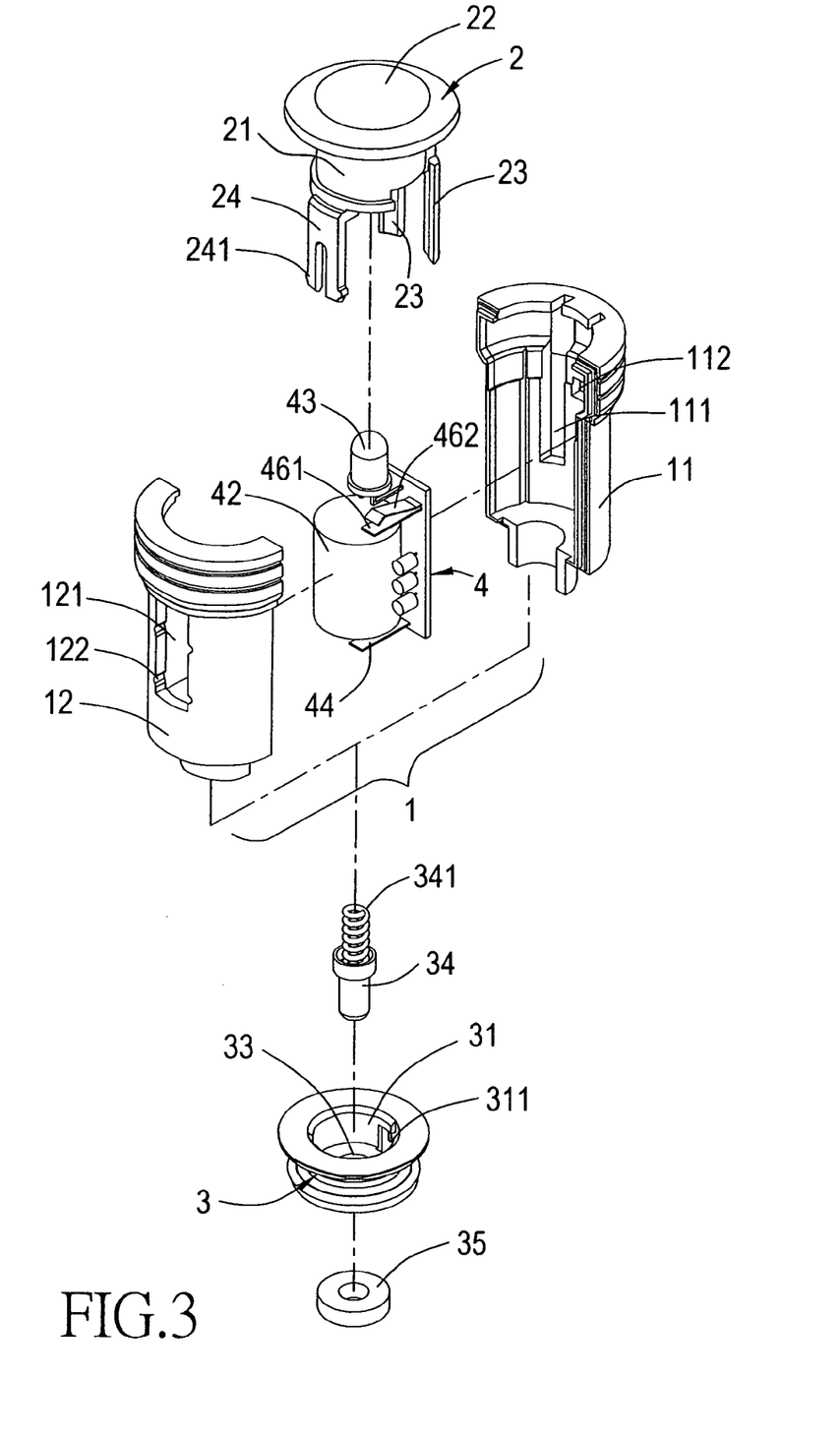
FIG. 3 shows an exploded elevational view from another visual angle according to the present invention.

Referring to FIGS. 1, 2 and 3, which show the present invention structured to comprise a cylindrical body 1, a cap 2, a casing cover 3, an illumination assembly 4 and an outer cylinder 5.

Figure 4:
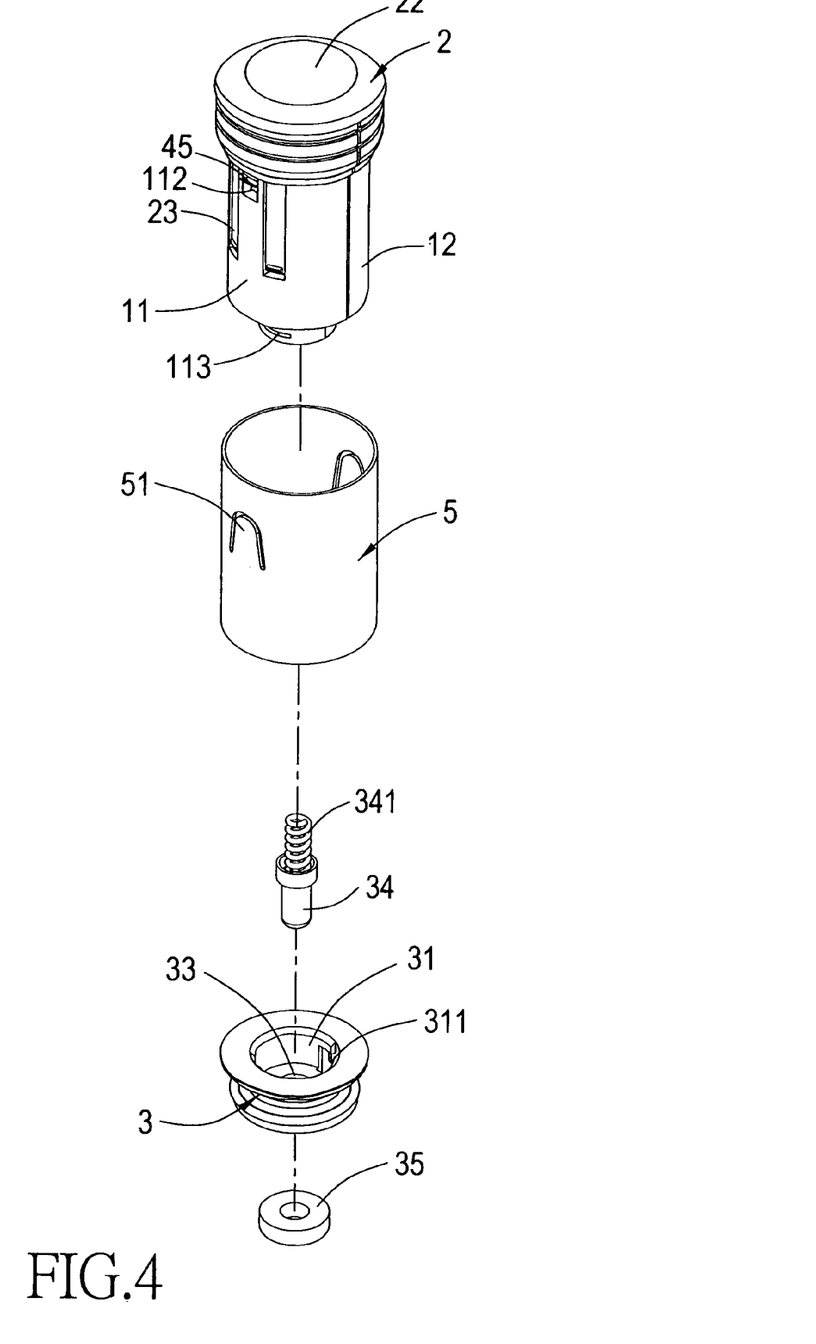
FIG. 4 shows an exploded schematic view of a casing cover and a cylindrical body according to the present invention.
Figure 5:
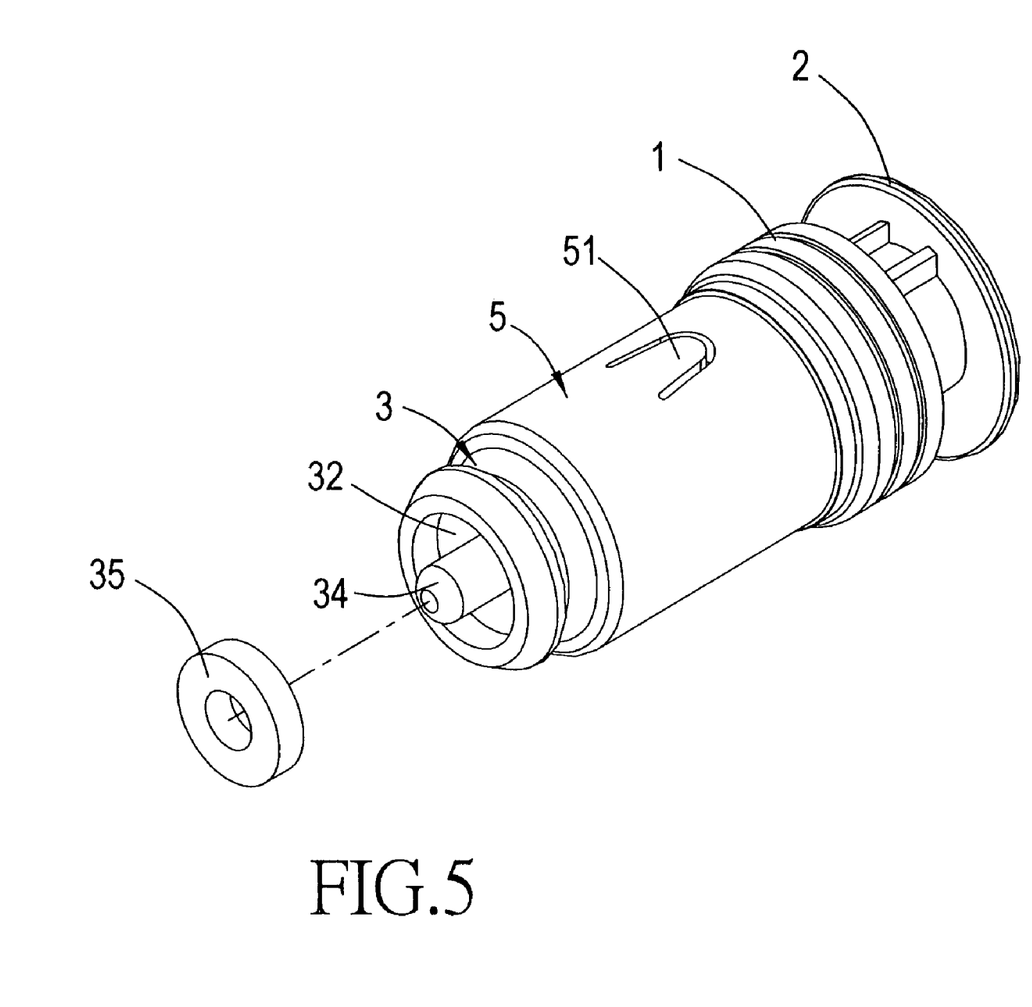
FIG. 5 shows an exploded schematic view of the casing cover and a strong magnetic ring according to the present invention.
Figure 6:
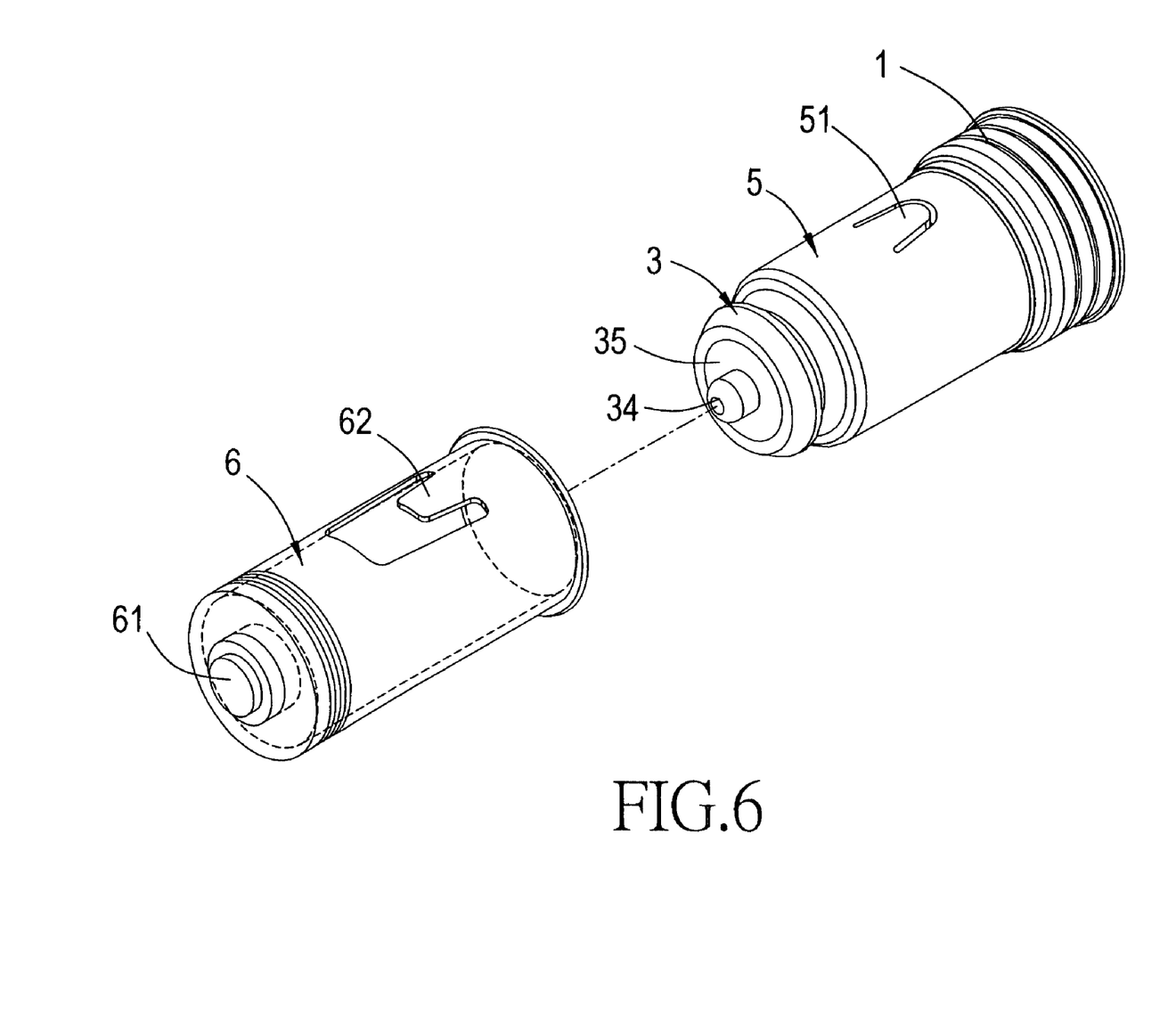
FIG. 6 shows a schematic view of a flashlight and a charger according to the present invention.
Figure 7:
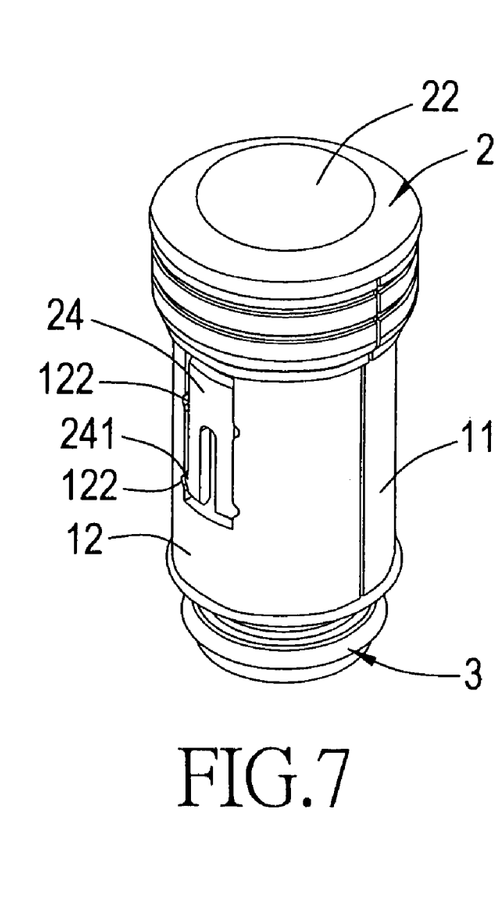
FIG. 7 shows a schematic view of a push adjustment device for a cap according to the present invention.
Figure 8:
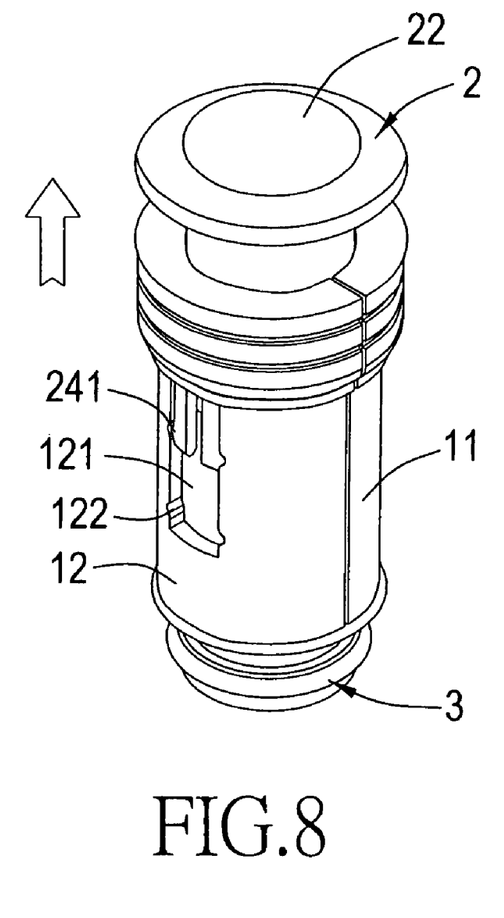
FIG. 8 shows a schematic view of the cap being push adjusted according to the present invention.
Figure 9:
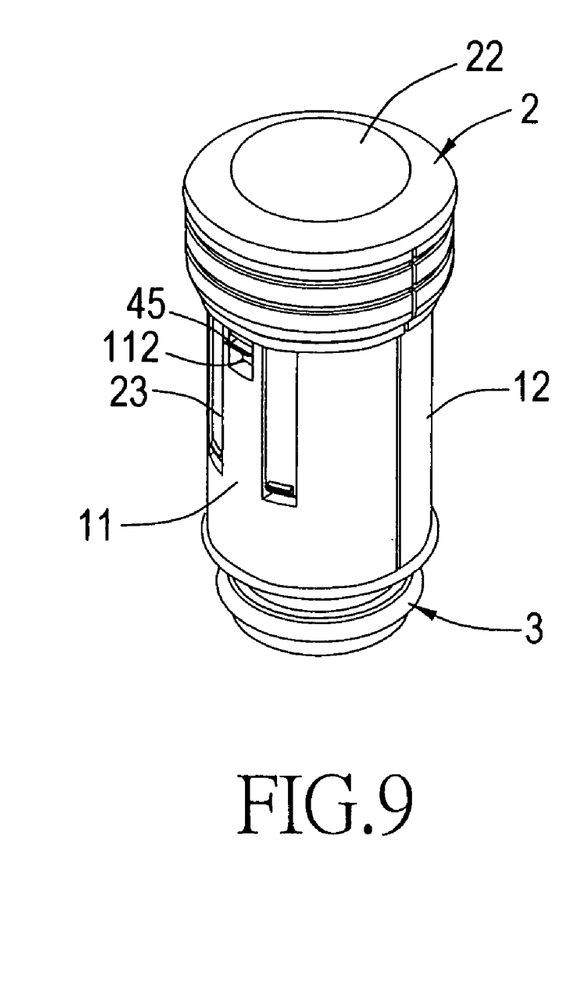
FIG. 9 shows a schematic view from another visual angle of the push adjustment device for the cap according to the present invention.
Figure 10:
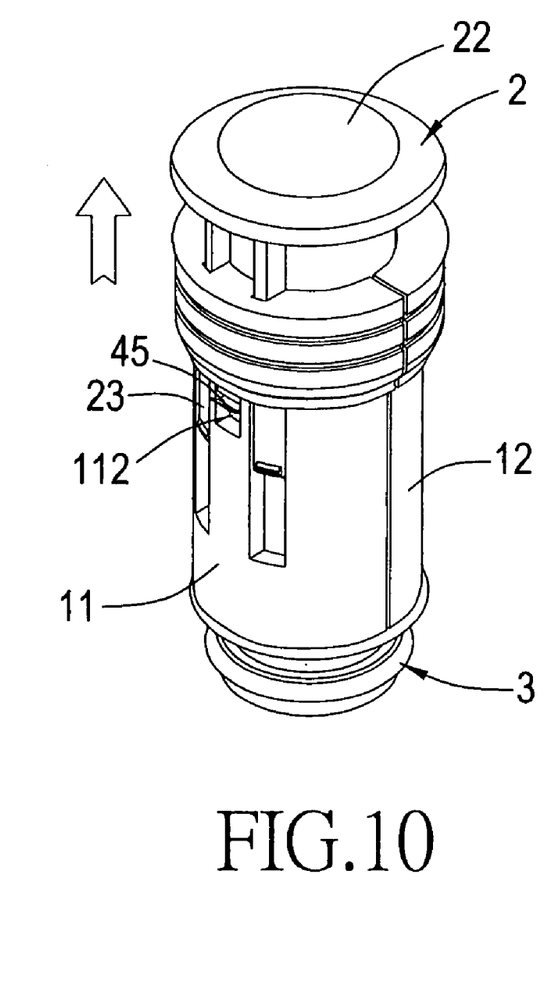
FIG. 10 shows a schematic view from another visual angle of the cap being push adjusted according to the present invention.
Figures 11, 12, 12A:
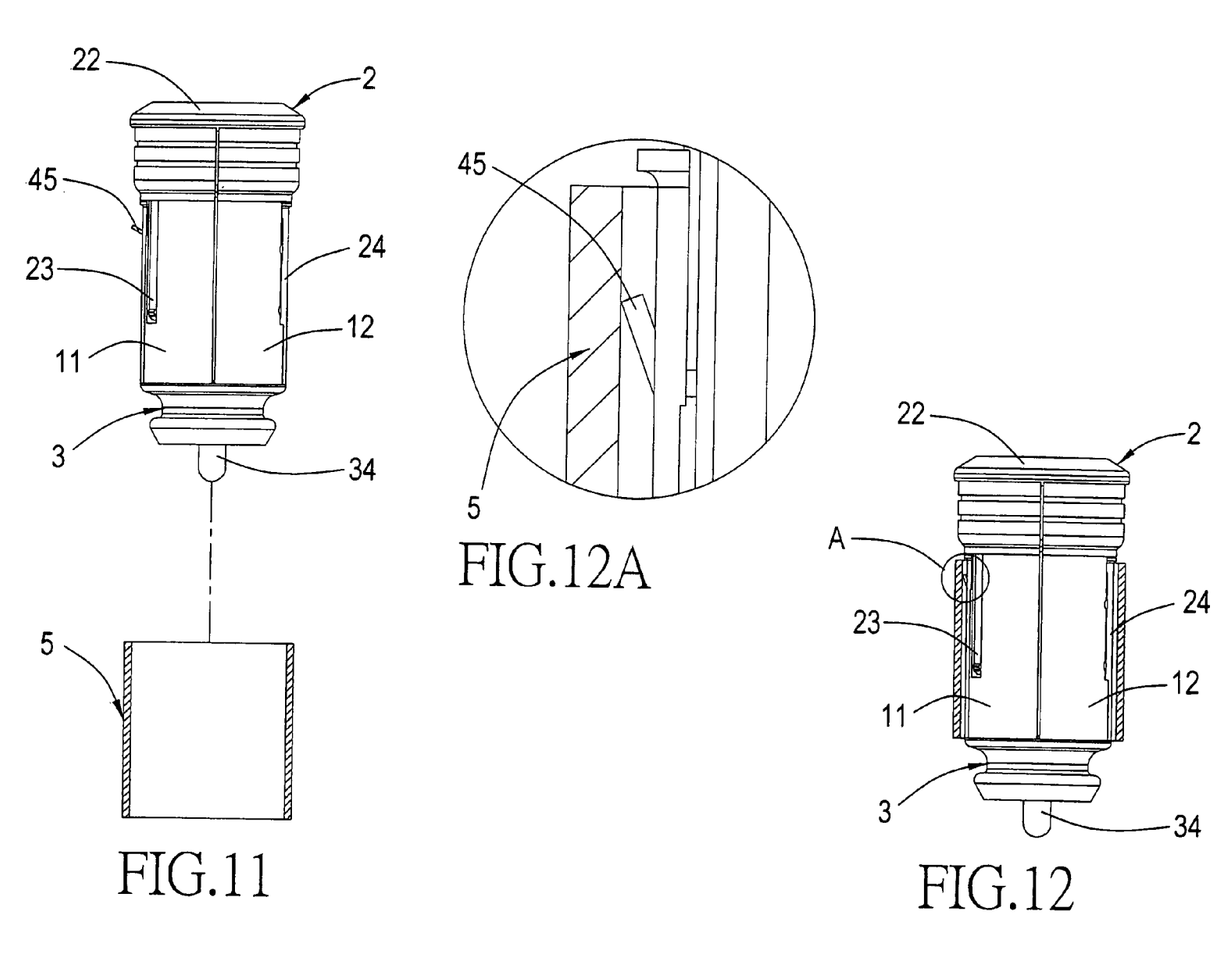
FIG. 11 shows an exploded schematic view of an outer cylinder joining with a cylindrical body according to the present invention.
FIG. 12 shows an assembled cutaway view of the outer cylinder joined with the cylindrical body according to the present invention.
FIG. 12A shows a schematic view of contact between a second electrical contact portion and the outer cylinder according to the present invention.
Figure 13:
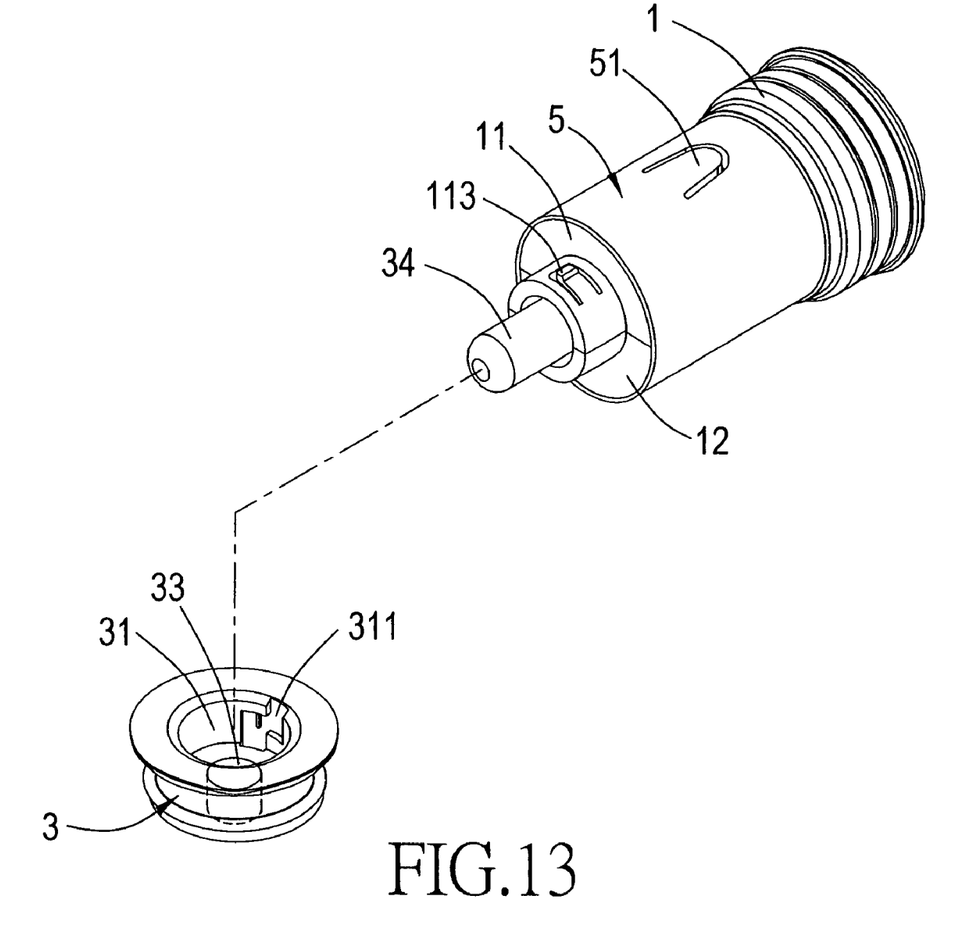
FIG. 13 shows an exploded view of the casing cover and a cylindrical body according to the present invention.
Figure 14:
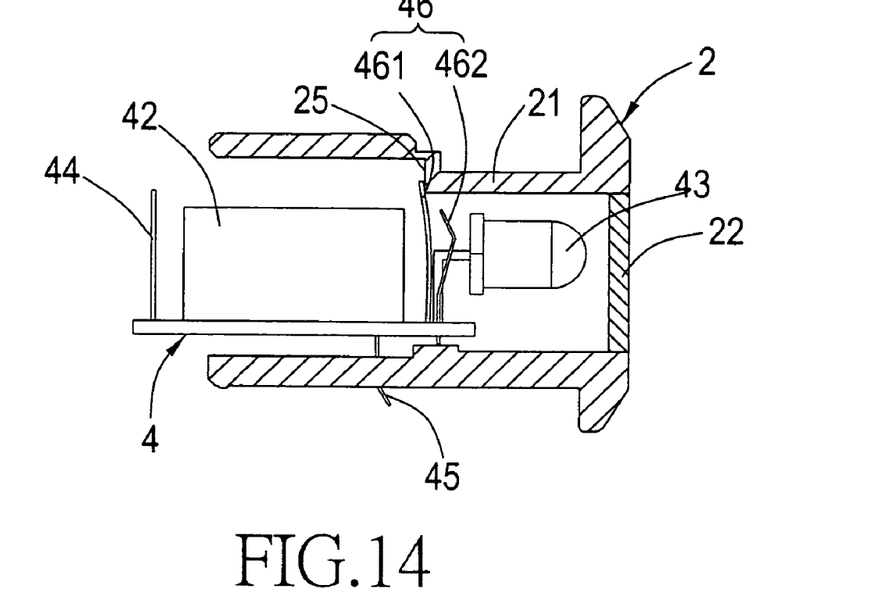
FIG. 14 shows a cutaway schematic view of a contact switch opened according to the present invention.
Figure 15:
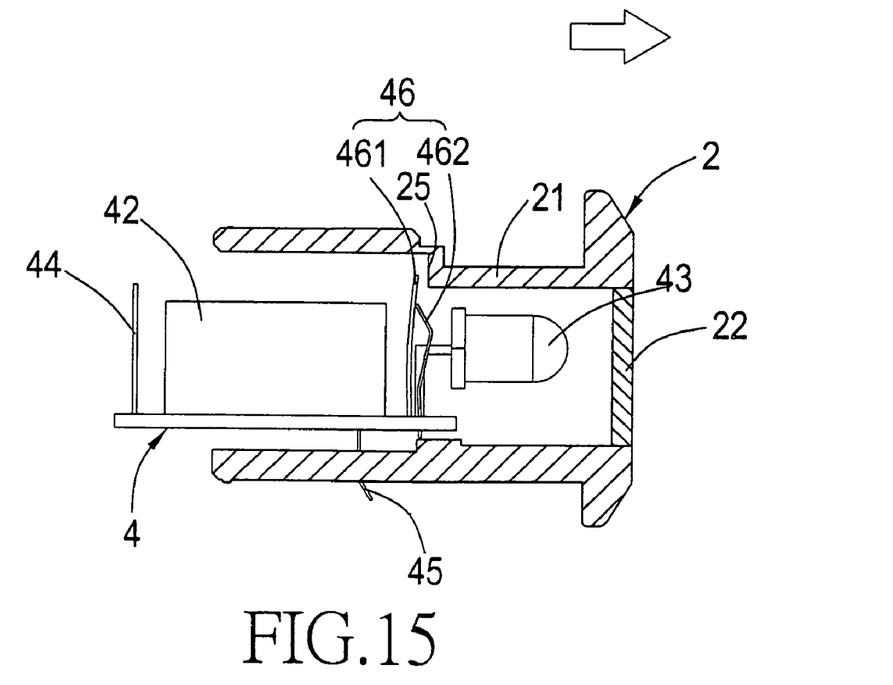
FIG. 15 shows a cutaway schematic view of the contact switch closed according to the present invention.
Figure 16:
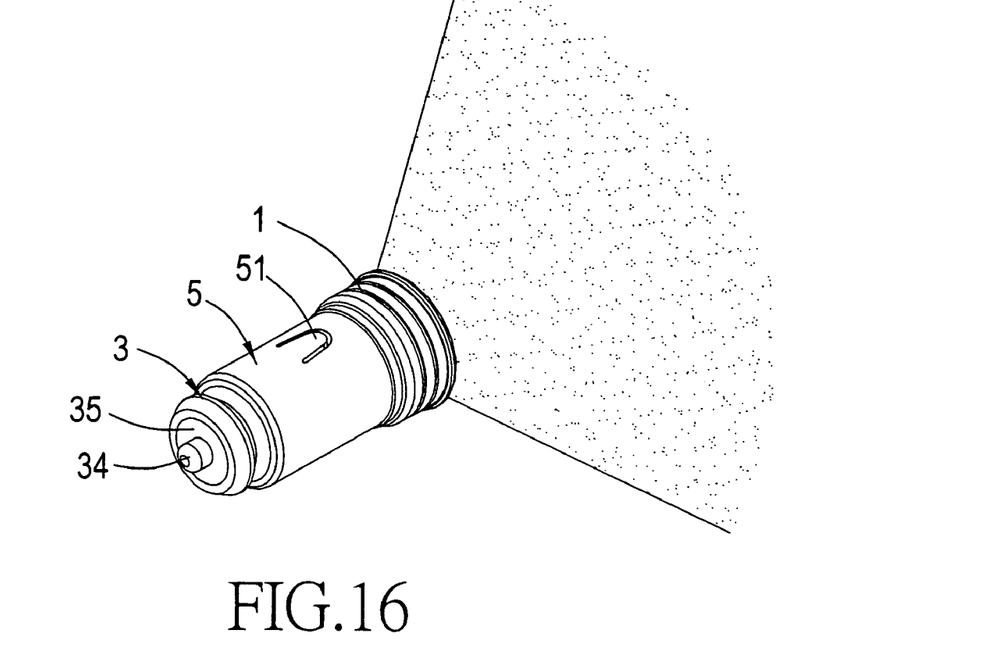
FIG. 16 shows a schematic view of an embodiment according to the present invention depicting an adjusted illumination range.
Figure 17:
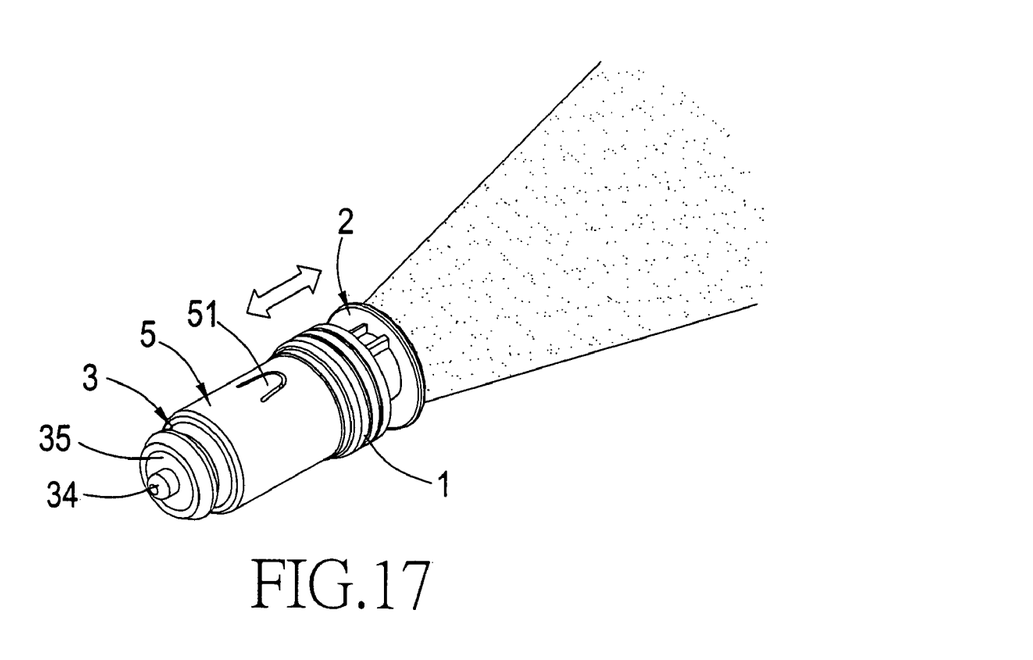
FIG. 17 shows a schematic view of the embodiment according to the present invention depicting illumination range being adjusted.

Referring to FIGS. 2, 3 and 4, the cylindrical body 1 comprises a first casing 11 reciprocally combined with a corresponding second casing 12. At least one first slide track 111 is defined on a surface of the first casing 11, and at least one second slide track 121 is defined on a surface of the second casing 12. Moreover, a set of positioning grooves 122 are respectively defined on two ends within the second slide track 121, and a through hole 112 is defined at an appropriate position in the first casing 11. Furthermore, a protruding catch 113 is configured on a surface of a rear end of the first casing 11 of the cylindrical body 1.

Referring to FIGS. 2, 3, 7, 8, 9, 10, 14 and 15, the cap 2 is disposed on a front end of the aforementioned cylindrical body 1. The cap is provided with a sleeve 21, and a transparent cover 22 provided with a convex lens seals a front end thereof. First slide strips 23 corresponding to the aforementioned first slide tracks 111 and second slide strips 24 corresponding to the aforementioned second slide track 121 extend from a rear end of the sleeve 21. The slide strips 23, 24 enable the cap 2 to slide along the lengths of the first slide tracks 111 and the second slide track 121 of the cylindrical body 1 respectively. Moreover, two sets of flanges 241 are respectively configured on two ends of the second slide strips 24 of the cap 2 so as to correspond to the positioning grooves 122, and a rear end of the sleeve 21 forms an acting face 25.

Referring to FIGS. 2, 3, 4, 5, 6 and 13, an end of the casing cover 3 is provided with a holding cavity 31, which provides for socket joining the rear ends of the aforementioned first casing 11 and second casing 12 of the cap 2 therein. A curved slide groove 311 is defined within the holding cavity 31 of the casing cover 3 so as to correspond to the protruding catch 113. Thus, after socket joining the first casing 11 and the second casing 12 of the cylindrical body 1 within the holding cavity 31 of the casing cover 3, the protruding catch 113 is securely positioned within the curved slide groove 311, thereby positionally retaining the casing cover 3. Furthermore, another end of the casing cover 3 is provided with a storage groove 32, center of which is defined a through hole 33. Two ends of the through hole 33 penetrate the holding cavity 31 and the storage groove 32 respectively. A contact bar 34 is disposed in the through hole 33, penetrates through the holding cavity 31, and protrudes from the storage groove 32. Moreover, an elastic electrically conducting contact member 341 extends from a front end of the contact bar 34, which is used to make an electrical contact with a first contact point 61 within a charger 6. Furthermore, a strong magnetic ring 35 is disposed within the storage groove 32.

Referring to FIGS. 2, 3, 4, 5, 6, 13, 14 and 15, the illumination assembly 4 is configured between the first casing 11 and the second casing 12 within the aforementioned cylindrical body 1. The illumination assembly 4 is provided with at least a base plate 41, on top of which is configured at least one accumulator unit 42, and at least one LED light 43. Furthermore, an electrical conducting contact portion 44 extends from a rear end of the base plate 41, and makes an electrical connection with the elastic electrical conducting contact member 341. Moreover, a second electrical conducting contact portion 45 extends from a side of the base plate 41, and penetrates the through hole 112 of the first casing 11. The second electrical conducting contact portion 45 is used to make an electrical contact with a second contact point 62 within the charger 6. A contact switch 46 is further configured on the base plate 41 so as to correspond to the aforementioned acting face 25. The contact switch 46 is provided with a rear end first contact piece 461 and a front end second contact piece 462, wherein the first contact piece 461, is disposed at a side of the acting face 25 of the cap 2. When the cap 2 is moved forward, the first contact piece 461 is made to come in contact with the second contact piece 462, thereby forming an electrical connection with the illumination assembly 4.

Referring to FIGS. 1, 4, 6, 11, 12 and 12A, the outer cylinder 5 is made from conductor material, and is disposed on an outer end of the cylindrical body 1, thereby covering the first casing 11 and the second casing 12, and enabling the second electrical conducting contact portion 45 to make an electrical connection with the outer cylinder 5. Moreover, elastic pieces 51 are respectively configured on two sides of the outer cylinder 5, which are used to make electrical contact with the second contact point 62 within the charger 6.

Referring to FIGS. 1, 2, 3, 4, 6, 7, 8, 9, 10, 14, 15, 16 and 17, the aforementioned structure can be plugged into the charger 6 as generally provided as a car interior accessory. Because aperture diameter of the charger 6 is not necessarily the same in all cars, If the aperture diameter of the charger 6 is relatively large, then the elastic pieces 51 on the outer cylinder 5 and the contact bar 34 of the cover 3 can be used to make contact with the second contact point 62 and the first contact point 61 within the charger 6 respectively, thereby charging the accumulator unit 42 within the illumination assembly 4. When electric power in the accumulator unit 42 is replenished, the user can take out the flashlight from the charger 6 and directly push the cap, 2 forward, thereby causing the cap 2 to slide along the first slide tracks 111 of the first casing 11 and the second slide track 121 of the second casing 12 of the cylindrical body 1, which actuates the acting face 25 at the rear end of the sleeve 21 of the cap 2, and causes the first contact piece 461 of the contact switch 46 to make electrical contact with the second contact piece 462, thereby providing an electric current to the LED light of the illumination assembly 43, which thus projects light out from the transparent cover 22 at the front end of the cap 2 that provides the user with auxiliary illumination. Whereas, when the cap 2 is pushed back to its original position, the first contact piece 461 is made to separate from the second contact piece 462, which causes the LED light to extinguish. Moreover, sliding distance of the cap 2 can be adjusted to vary the distance between the LED light 43 and the transparent cover 22, thereby adjusting focus of the light source and illumination range of the light beam. When the cap 2 is adjusted to an appropriate distance, then the flanges 241 of the second slide strips 24 are clasped within the positioning grooves 122, thereby securely positioning the cap 2. When the user is looking for an article or carrying out some task inside a car, then the strong magnetic ring 35 at the end of the cover 3 can be used to magnetically attract and secure the flashlight to an appropriate position in the car interior, thereby freeing both hands of the user to carry out tasks without the need to divide his attention to handling the flashlight.

According to the aforementioned embodiment, the present invention can be seen to have the following advantages:

1. The car flashlight, configured from the cylindrical body 1 structured by reciprocally combining the first casing 11 and the corresponding second casing 12, and the cap 2 joined therein, provides an effective compact flashlight that does not take up space when not in use.

2. The car flashlight can conveniently use the charger 6 in a car to replenish electric power, thereby achieving the need for convenience of use.

3. The strong magnetic ring 35 at the end of the cover 3 of the car flashlight can be used to magnetically attract and secure the flashlight to any position in the car interior, thereby providing the user with a fixed auxiliary light source that frees both hands to carry out tasks.

In conclusion, the aforementioned detailed disclosures of the structural art of the present invention clearly show that the present invention achieves the objectives of convenience and safety when driving. Furthermore, the present invention has not appeared in any related product, and accordingly complies with essential elements as required for a new patent application, in accordance with which a new patent application is proposed herein.

It is of course to be understood that the embodiments described herein are merely illustrative of the principles of the invention and that a wide variety of modifications thereto may be effected by persons skilled in the art without departing from the spirit and scope of the invention as set forth in the following claims.

What is claimed is:

1. A car flashlight structural, which can be plugged into a car charger, comprising:
    a cylindrical body that consists of a first casing reciprocally combined with a corresponding second casing, at least one first slide track is defined on a surface of the first casing, and at least one second slide track is defined on a surface of the second casing, moreover, a through hole is further defined in the first casing;
    a cap disposed on a front end of the cylindrical body, the cap is provided with a sleeve, and a transparent cover seals a front end thereof, first slide strips corresponding to the first slide tracks and second slide strips corresponding to the second slide tracks extend from a rear end of the sleeve, which enable the cap to slide along the lengths of the first slide tracks and the second slide tracks of the cylindrical body respectively, moreover, a rear end of the sleeve forms an acting face;
    a casing cover provided with a holding cavity in one end thereof, which provides for socket joining rear ends of the first casing and the second casing of the cap therein, a through hole is defined center of the casing cover, and a contact bar is disposed therein, which is used to make an electrical contact with a first contact point within a charger, moreover, an elastic electrically conducting contact member extends from a front end of the contact bar;
    an illumination assembly configured between the first casing and the second casing within the cylindrical body, the illumination assembly is provided with at least a base plate, on one side of which is configured at least one accumulator unit, and at least one LED light, on a front end moreover, a first electrical conducting contact portion extends from a rear end and makes an electrical connection with the elastic electrical conducting contact member, and a second electrical conducting contact portion extends from an opposite side of the base plate, and penetrates the through hole of the first casing, the second electrical conducting contact portion is used to make an electrical contact with a second contact point within the charger, a contact switch is further configured on the base plate so as to correspond to the acting face;
    whereby the cap actuates the acting face when pushed forward, and pushes against the contact switch, thereby enabling electric current to flow to the LED light of the illumination assembly, which thus emits light.

2. The car flashlight structural as described in claim 1, wherein a set of positioning grooves are respectively defined on two ends within the second slide track, moreover, a set of flanges are respectively configured on two ends of the second slide strips so as to correspond to the positioning grooves; when the cap is adjusted to an appropriate distance on the cylindrical body, then the flanges of the second slide strips clasp within the positioning grooves, thereby securely positioning the cap.

3. A car flashlight structural as described in claim 1, wherein an outer cylinder made from conductor material is disposed on an outer end of the cylindrical body, thereby covering the first casing and the second casing, and enabling the second electrical conducting contact portion to make an electrical connection with the outer cylinder.

4. A car flashlight structural as described in claim 3, wherein an elastic piece is configured on at least one side of the outer cylinder, which is used to make electrical contact with the second contact point within the charger.

5. A car flashlight structural as described in claim 1, wherein the transparent cover is a convex lens, which focuses light rays emitted by the LED light as they pass therethrough before being projected outward.

6. A car flashlight structural as described in claim 1, wherein a protruding catch is configured on a surface of a rear end of the first casing of the cylindrical body, moreover, a curved slide groove is defined within the holding cavity of the casing cover so as to correspond to the protruding catch; after socket joining the first casing and the second casing of the cylindrical body within the holding cavity of the casing cover, the protruding catch is securely positioned within the curved slide groove, thereby positionally retaining the casing cover.

7. A car flashlight structural as described in claim 1, wherein another end of the casing cover is provided with a storage groove, two ends of the through hole of the casing cover penetrate the holding cavity and the storage groove respectively, and the contact bar disposed in the through hole penetrates through the holding cavity, and protrudes from the storage groove.

8. A car flashlight structural as described in claim 7, wherein a strong magnetic ring is disposed within the storage groove.

9. A car flashlight structural as described in claim 1, wherein the contact switch is provided with a rear end first contact piece and a front end second contact piece, moreover, the first contact piece makes contact with the acting face of the cap; when the cap is moved forward, the first contact piece is caused to come in contact with the second contact piece, thereby forming an electrical connection with the illumination assembly.

* * * * *